(12) United States Patent
Ting et al.

(10) Patent No.: US 7,258,887 B2
(45) Date of Patent: *Aug. 21, 2007

(54) PREPARATION OF LIGHT STABLE HOPS

(75) Inventors: Patrick L. Ting, Brookfield, WI (US); Henry Goldstein, Hartland, WI (US); Aki A. Murakami, Mequon, WI (US); Michael VanSanford, Wales, WI (US); Jay R. Refling, Greenfield, WI (US); John R. Seabrooks, Richfield, WI (US); David S. Ryder, Mequon, WI (US)

(73) Assignee: Miller Brewing Company, Milwaukee, WI (US)

( * ) Notice: Subject to any disclaimer, the term of this patent is extended or adjusted under 35 U.S.C. 154(b) by 365 days.

This patent is subject to a terminal disclaimer.

(21) Appl. No.: 10/106,603

(22) Filed: Mar. 26, 2002

(65) Prior Publication Data
US 2003/0185933 A1 Oct. 2, 2003

(51) Int. Cl.
*C12C 3/00* (2006.01)

(52) U.S. Cl. ............ 426/600; 426/429; 426/431; 426/489

(58) Field of Classification Search ........ 426/600, 426/429, 431, 478, 489
See application file for complete search history.

(56) References Cited

U.S. PATENT DOCUMENTS

| | | | |
|---|---|---|---|
| 3,952,061 A | 4/1976 | Koller et al. | |
| 4,002,683 A | 1/1977 | Todd, Jr. | |
| 4,234,516 A * | 11/1980 | Koller et al. ........... | 568/341 |
| 4,490,405 A * | 12/1984 | von Horst et al. ...... | 426/600 |
| 4,666,731 A * | 5/1987 | Todd, Jr. .............. | 426/600 |
| 4,765,993 A | 8/1988 | Owades | |
| 4,767,640 A | 8/1988 | Goldstein et al. | |
| 4,778,691 A | 10/1988 | Todd, Jr. | |
| 4,844,939 A | 7/1989 | Todd, Jr. | |
| 4,956,195 A | 9/1990 | Todd, Jr. et al. | |
| 5,013,571 A | 5/1991 | Hay | |
| 5,013,572 A | 5/1991 | Hay | |
| 5,073,396 A | 12/1991 | Todd, Jr. | |
| 5,296,637 A | 3/1994 | Stegink et al. | |
| 5,523,489 A | 6/1996 | Ting et al. | |
| 5,767,319 A | 6/1998 | Ting et al. | |
| 5,783,235 A | 7/1998 | Ting et al. | |
| 5,874,633 A | 2/1999 | Ting et al. | |
| 5,917,093 A | 6/1999 | Ting et al. | |
| 5,972,411 A | 10/1999 | Goldstein et al. | |
| 6,020,019 A | 2/2000 | Ting et al. | |

FOREIGN PATENT DOCUMENTS

| | | |
|---|---|---|
| DE | 635624 | 4/1937 |
| DE | 10139479 A1 | 2/2003 |
| SU | 1601112 A1 | 10/1990 |
| WO | WO97/46116 A1 | 12/1997 |

OTHER PUBLICATIONS

PCT Search Report for PCT/US03/08637.

* cited by examiner

*Primary Examiner*—Arthur L. Corbin
(74) *Attorney, Agent, or Firm*—Quarles & Brady LLP

(57) ABSTRACT

Disclosed are methods for the production of light stable hops, useful for the brewing of beer or ale to be stored in clear or green glass containers, which beer or ale will not develop objectionable flavor as a result of exposure to light. Light stable hops are prepared by double extraction of liquid/supercritical $CO_2$ extracted hop solids with ethanol to remove alpha/iso-alpha-acids. Such alpha/iso-alpha-acids may be further removed from the ethanol extraction liquor obtained in the double extraction process by subjecting such liquor to an ion exchange medium, or precipitation by a metal ion, heavy metal ion, or alkali metal ion, to provide an alpha/iso-alpha-acid is free extraction liquor which may be added to the light stable hops residue obtained in the initial double extraction process.

11 Claims, No Drawings

PREPARATION OF LIGHT STABLE HOPS

CROSS REFERENCES TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention relates to the treatment of hop solids which is the residue remaining after liquid or supercritical $CO_2$ extraction, and produces a hop product which imparts not only hop flavor and mouthfeel indistinguishable from original whole hops, but also provides light stability and flavor variations in malt beverages. Such treated hop solids can contribute hop flavor and mouthfeel to beer with low bitterness. However, a residual amount of alpha/iso-alpha-acids, which causes light instability in finished malt beverages, is still present in the hop solids. The present invention is directed to the preparation of light stable hop products, containing little or no alpha/iso-alpha-acid, for providing hop flavor and character for beer products which may be packaged in flint, clear, or green bottles.

2. Description of the Related Art

Hops, in the form of either the ground dried plant or pellets, are used in brewing to give malt beverages such as beer or ale their essential characteristics of aroma, flavor, mouthfeel, and bitterness, as well as contributing foam and anti-microbial activity to the brew. The hops are usually added to the boiling wort in the brewing kettle, and then fermented by yeast to produce the finished product. During boiling, alpha-acids in the hops are converted into iso-alpha-acids, which contribute the bitterness and foam in the finished product. Such iso-alpha-acids are, however, susceptible to a photochemical reaction which produces "skunk", an undesirable sulfur flavor characteristic resulting from the presence of 3-methyl-2-butene-1-thiol. This reaction is known to occur when the finished product is packaged in flint or green bottles and exposed to light.

Hops may be separated into hop soft resins, i.e. $CO_2$ hop extract (containing the extracted alpha-acids, beta-acids, and hop oil fraction or HOF), and hop solids, by employing liquid/supercritical $CO_2$ or less-polar organic solvent extractions. The $CO_2$ hop extract contributes most of the bitterness flavor in beer. Beer brewed solely with the $CO_2$ hop extract does not impart a complete hops flavor spectrum to the beer due to the absence of the water-soluble components, which apparently remain in the hop solids. The bitterness flavor can also be added as pure forms after fermentation or in the finished products. To integrate the full spectrum of hop flavor would thus require the addition of hop solids to the brew, but the hop solids have been found to contain trace amounts of alpha/iso-alpha-acids, which, due to lack of light stability, contribute to skunkiness in beer. Therefore, to obtain the full flavor of the hops while avoiding skunkiness in beer, light stable hops would be of value.

It is known that there are a number of U.S. patents relative to this matter, such as Ting et al. U.S. Pat. No. 5,783,235, which teaches the preparation of a hop flavored, less bitter fermented beverage by addition of the solid hop residue remaining after $CO_2$ extraction (as the sole hopping agent) to the wort, boiling the mixture, removing the solids from the fermented mixture, and fermenting the remainder to obtain the final product. While this method does provide a brew having less bitterness but a comparable hop flavor to a brew prepared using whole hops, it does not fully address the issue of iso-alpha-acids present in the solid hop residue. In a preferred embodiment of the Ting et al. '235 method, the solid hop residue and the hop oil fraction (HOF), which is the residue of a hop extract remaining after removal of alpha-acids and beta-acids from the hop extract obtained from the $CO_2$ extraction, are pelletized and added to the wort prior to or during boiling. After the mixture is boiled and fermented with yeast to convert the hop components and the wort, the solids are then separated to obtain the liquid product. Since the solid hop residue is present in the brewing kettle, iso-alpha-acids are present in the final brew, potentially leading to an undesirable skunk flavor.

Ting et al., in U.S. Pat. No. 5,767,319, teach conversion of iso-alpha-acids to light stable tetrahydroiso-alpha-acids, which are known bittering agents. While an improvement over previous conversion methods, the patent necessitates additional treatment steps to obtain specified metal salts of the iso-alpha-acids, dissolving the metal salts in an aqueous alcohol medium, and reducing the iso-alpha-acids by hydrogenation under specific conditions to form the tetrahydroiso-alpha-acids, which are then recovered from the reaction medium. Such a method clearly adds complexity to the desired goal of providing a light stable form of hops.

In addition, Ting et al. teach, in U.S. Pat. No. 6,020,019, a method for the hydrogenation of hop soft resins, wherein carbon dioxide is used as a reaction solvent, in liquid or supercritical fluid form, for the conversion of iso-alpha-acids or beta-acids to tetrahydroiso-alpha-acids (tetrahydroisohumulones), preferably using an acidic lower alcohol to act as a promoter for the beta-acids. As previously indicated, tetrahydroiso-alpha-acids are known light-stable FDA-approved bittering agents which may be used to add hop flavoring to beer. In this patent, it was noted that the tetrahydroiso-alpha-acids were previously generally not made from the alpha-acids for economical reasons. The hydrogenation method of this patent permits the use of alpha-acids as a source of tetrahydroiso-alpha-acid for use in brewing.

Additional patents to Ting et al. include U.S. Pat. Nos. 5,523,489, 5,874,633, and 5,917,093. In these patents, methods for the preparation and/or purification of tetrahydroiso-alpha-acids (tetrahydroisohumulones) are discussed. In U.S. Pat. No. 5,523,489, tetrahydroisohumulones are prepared from isohumulones by hydrogenation in ethanol. In U.S. Pat. No. 5,917,093, alpha-acids and beta-acids present in the hop oil fraction of $CO_2$ Hop Extracts are purified by mixing with an absorbent to remove catalyst poisons, thereby reducing the amount of catalyst necessary for hydrogenation to tetrahydroiso-alpha-acids and tetrahydrodesoxy-alpha-acids. In U.S. Pat. No. 5,874,633, patentees teach a method of hydrogenating and formulating a starting solution of iso-alpha-acids to obtain concentrated solutions of tetrahydroiso-alpha-acids.

In U.S. Pat. No. 5,972,411, Goldstein et al. teach the isolation and characterization of a group of odorless and non-volatile glycosides from extracted hops (hop solids which have previously been extracted with liquid/supercritical $CO_2$ or less-polar solvents.) These glycosides are water soluble and consist of a group of aromatic compounds conjugated to mono-, di- and tri-saccharides. These glycosides are responsible for the formation of kettle hop flavor. Through both chemical and biological transformations, an essence and flavorant can be prepared for addition to an unhopped beer. These kettle hop flavor essences and flavorants provide economy, consistency, flexibility, quality and convenience to the brewing process because only one unhopped wort is required to brew a stock of unhopped beer, which can then be dosed with the desired amount of kettle hop flavor essence and flavorant.

In U.S. Pat. Nos. 5,013,571 and 5,013,572, Hay teaches methods for converting alpha acids to hop bittering flavors by exposing the alpha acids to an environment capable of isomerizing and reducing the alpha acids to form either tetrahydroiso-alpha-acids or hexahydroiso-alpha acids, and then steam stripping odor forming impurities from such to produce purified light stable hop bittering compounds.

In addition to the above, U.S. Pat. No. 4,002,683, of Todd, Jr., teaches a process for isomerizing alpha acids to iso-alpha-acids by contact with an aqueous solution of a metal ion to form materials suitable for use as bittering additives, wherein a water-immiscible organic solvent in which the alpha acid is soluble is employed. Todd, Jr., also teaches, in U.S. Pat. No. 4,666,731, the separation of the constituents of $CO_2$ Hop Extracts employing aqueous alkali, followed by conversion of the separated alpha acid fraction into an iso-alpha acid or isohumulone fraction useful in the bittering of beer. Moreover, Todd, Jr. et al. teach, in U.S. Pat. Nos. 4,778,691 and 4,956,195, the removal of odor-forming impurities from hop flavors by extracting into water at a pH above 5, and separating the aqueous phase containing the impurities from the purified hop flavors, to recover a flavoring agent selected from unreduced and reduced alpha acids and iso-alpha-acids which is essentially odor-causing-impurity free. And, in U.S. Pat. No. 5,073,396, Todd, Jr. teaches the use of a non-acidic hop flavor fraction for production of beer, wherein the hop flavor fraction is made from $CO_2$ hop extract to provide an extract essentially devoid of alpha and beta acids, by fractionation of the hop extract with an alkaline solution within controlled pH ranges. In U.S. Pat. No. 5,296,637, Stegink et al. teach production of odor-free tetrahydroisohumulates from alpha acids via the tetrahydrohumulates and subsequent isomerization.

Thus, there are a number of processes for the preparation, separation, purification, and use of hop bittering flavors for beer. However, a method for the production of light stable hops containing little or no alpha/iso-alpha-acids, which also imparts hop aroma and flavor to the brewing of beer equivalent to or comparable to the aroma and flavor attained from the use of conventional hops, has not previously been provided.

SUMMARY OF THE INVENTION

The present invention provides means for providing light stable hops which impart hop aroma and flavor to beer, without the potential for light sensitivity resulting in skunkiness. Several techniques have been employed to prepare light stable hops, which were evaluated by sensory testing for light stability and acceptable hop flavor attributes. These techniques included exhaustive extraction (double extraction, or DX) of hop solids to obtain a basic hop residue and an extract containing most of any trace alpha/iso-alpha-acids; applying an ion exchange removal of the alpha/iso-alpha-acids in the extract from said double extraction, followed by return of the effluent from said ion exchange to the residue of the double extraction, and concentration of this mixture to obtain a more flavorful light stable hop; and utilizing a metal ion precipitation treatment removal of alpha/iso-alpha-acids in the extract from said double extraction, followed by return of the filtrate of said precipitation treatment to the residue of the double extraction, and concentration of this mixture to obtain a light stable hop.

When the products of these techniques were used in the preparation of brewed beer, the resulting brews were confirmed to be light stable, and the light stable hops employed made a contribution to kettle hop flavor attributes. Still further, it was found that a full form of hop was reconstituted with a hop oil fraction (HOF), a beta-acid rich fraction (which is obtained from the hop extract resulting from initial preparation of the hop solids by liquid or supercritical $CO_2$ extraction), and light stable bittering agents (and prior to the double extraction method of the present invention) to each of these light stable hops and yielded a further flavor improvement without causing light instability in brewed product.

It is thus an advantage of the present invention to provide an inexpensive method for the preparation of light stable hops, which are useful in providing hop flavor and mouth-feel for brewed product to be packaged in clear, flint or green bottles. Such brewed product is found to be less subject to skunk flavor resulting from exposure to light over time.

DETAILED DESCRIPTION OF THE INVENTION

Methods for Preparation of Light Stable Hops

A thermal decomposition of hop solids in the presence of hot air was unsuccessful, and most residual amounts of alpha-acids were converted into iso-alpha-acids, resulting in a light unstable product. Direct isomerization and reduction of trace amounts of alpha-acids to light stable rho-iso-alpha-acids (or dihydro iso-alpha-ac,ids) in an aqueous hop solid slurry was attempted, employing a caustic sodium borohydride solution ($NaBH_4$). Results were inconsistent, and high performance liquid chromatography (HPLC) analysis indicated that the reduction in alpha-acid content was ineffective due to interference of hop solid materials.

Since it is known that trace amounts of alpha/iso-alpha-acids (about 0.1-0.5 weight percent) seem to bind very tightly within the hop cellulose matrix, thus making a direct chemical reaction or reduction difficult, it was decided to attempt the reduction or elimination of alpha/iso-alpha-acids by extraction in a homogenous solution system. Low molecular weight alcohols, such as methanol or ethanol, are capable, with efficient mixing, of extracting sufficient amounts of alpha/iso-alpha-acids from hop solids. Due to the cost and potential toxicity of methanol, ethanol has been utilized. In addition to being safe for consumption, 95% ethanol is less soluble for the water-soluble compounds and very soluble for the alpha/iso-alpha-acids. An analytical scale extraction condition was established by comparing the extraction efficiency of acidic 95% ethanol, 95% ethanol, acidic 70% ethanol, and 70% ethanol, using Galena hop solids.

The Hop Solids Double Extraction Technique

To 200 grams of ground hop solids (prepared from either Cascade hops or Galena hops) was added 600 ml of 95% ethanol. The mixture was then agitated, with a magnetic stir bar, for one hour, followed by vacuum filtration through a Whatman #4 filter paper. The filtrate was retained. The extraction was repeated with another 600 ml of 95% ethanol, and the mixture was again vacuum filtered through a Whatman #4 filter paper. The residues on the funnel were washed with an additional 100 ml of 95% ethanol. Both filtrates from the two extractions were combined, and the residues were collected. Results are shown in Table 1.

TABLE 1

Extraction Efficiency Analyzed by HPLC

| Extraction Solution | Density (g/ml) of Extract | alpha/Iso-alpha-acid in Galena Hop Solids (%) |
|---|---|---|
| 95% ethanol, Acid | 0.81 | 0.12 |
| 95% ethanol | 0.99 | 0.10 |
| 70% ethanol, Acid | 1.04 | 0.15 |
| 70% ethanol | 1.02 | 0.12 |

Although the acidic ethanol solutions are demonstrably more effective than neutral solutions, it is possible that the acid may damage the flavor elements of hop solids, or interfere with subsequent treatments. It is also noted that higher water composition solvents co-extract more water soluble compounds. For instance, a dark green color solution (with density of 0.99 g/ml) was obtained using 95% ethanol, while a yellow-brownish color solution (with a density of 1.02 g/ml) was obtained using 70% ethanol. In other words, a total mass of greater than 25% by weight was obtained as compared to 6% when the water composition was increased to 30% (70% ethanol/water) from 5% (95% ethanol) extraction of hop solids. The best results for the reduction and minimization of alpha/iso-alpha-acids appeared to occur in a less complicated 95% ethanol extract. Therefore, hop solids were extracted using 95% ethanol until most of the alpha/iso-alpha-acids were removed, and subjected to the subsequent treatments. This usually required two consecutive extractions, and the hop solid residues after such a double extraction using 95% ethanol still retain most of the potential water-soluble flavor precursors. This double extracted hop solid residue was then adopted as a basic light stable hop, and further treatment of the liquid filtrate from the double extraction to recover minor amounts of flavor precursors was considered.

Further Treatment of the Double Extracted Hop Solids Filtrate

The treatment sought should selectively minimize alpha/iso-alpha-acids, but should also be mild and inert to the flavor precursors. Hydrogenation, sodium borohydride reduction, caustic treatment, ion exchange, alkali metal and metal precipitation were considered for the elimination of alpha/iso-alpha-acids, or for conversion of alpha/iso-alpha-acids into light stable forms. Hydrogenation was unsuccessful. Sodium borohydride reduction of iso-alpha-acids to rho-iso-alpha-acids was possible, but the subsequent removal of undesirable boron compounds added extra steps and expense, and was therefore considered inefficient. However, both ion exchange and alkali metal or metal ion precipitation showed promising results. The thus treated aqueous ethanol solutions were recombined with the residues and the aqueous ethanol in the mixture was then removed via evaporation to form reconstructed light stable hops. The two successful methods are demonstrated hereinafter.

Ion-Exchange Treatment

A basic ion exchange resin has been used in the past to separate alpha/iso-alpha-acids from methanolic, ethanolic, and hexane extract of hops. Such methods have been used to chromatographically purify alpha-acids, beta-acids, and iso-alpha-acids from hops or hop extract, in which various organic solvents and buffering solutions were used. We altered this methodology to retain the alpha/iso-alpha-acids on the resins by varying the affinity of the effluent and allowed an elution of alpha/iso-alpha-acids-free effluent. Recombining the alpha/iso-alpha-acids-free effluent and the extracted hop solid residues afforded a slurry. Evaporation of the aqueous ethanol and drying of the slurry afforded a less distinguishable hop product than the original hop solids, but containing no light unstable alpha/iso-alpha-acids. Two types of ion exchange resins, BIO-RAD AG 1×4 and 3×4, available from Bio-Rad Laboratories of Richmond, Calif. were used. Due to pKa differences, the dissociated alpha/iso-alpha-acid ions exchange with these anions ($Cl^-$, $OH^-$, and acetate ion) on the resins. The ethanol extracted solution of the hop solids was diluted with water (either neutral or pH 8) to increase affinity between alpha/iso-alpha-acids and resins. Ion exchange may be performed on either a column or batch basis. For convenience, a batch basis was used in our experimentation. As a result, the residual alpha/iso-alpha-acids were significantly reduced, as shown in Table 2, items 3, 4, 5, 6, 11, and 12.

Ion Exchange Technique

Two BIO-RAD anion exchange resins (AG 1-X4, and 3-X4, 400 mesh, chloride form) were pre-rinsed with distilled water. The filtrate was diluted with a 1:1 ratio of either distilled water or a pH 8 buffer solution, and then added to the ion exchange resins at an amount of 5% of the total mixture. The mixture was allowed to mix for one hour, then filtered through a Whatman #4 filter paper. The filtrate was mixed with the double extracted residues. The hop residues and the extracted flavor precursors present in the filtrate were simultaneously and homogeneously mixed while the aqueous ethanol was evaporated off by a vacuum rotary evaporator. The resultant hop solids were then dried for final usage.

Alkali Metal or Metal Ion Precipitation

Hop alpha-acids and iso-alpha-acids often show a characteristic of complexing with alkali metal ions, divalent ions, and transitional metal ions such as magnesium, calcium, lead, ferric, zinc, etc. The tri-keto group on the molecule has the functionality of chelating with various metal ions. Some of the complexes thus formed are less soluble in water and alcohol. Accordingly, in order to select desirable and effective alkali metal or metal ions which comply with FDA regulations, and to still meet brewing requirements, a number of inorganic salts such as calcium carbonate, calcium hydroxide, magnesium hydroxide, magnesium acetate, zinc sulfate, and zinc acetate were selected.

Alkali Metal/Metal Ion Precipitation Technique

To 1200 ml. of filtrate from the double extraction, an equal amount of distilled water was added to reduce the solubility of subsequent forming complexes of alpha/iso-alpha-acids. From 1 to 5 grams of the alkali metal or metal salts, $Ca(OH)_2$, $Ca(OAc)_2$, $CuCl$, $CuSO_4$, $ZnSO_4$, and $Zn(OAc)_2$, respectively, were added to the diluted filtrate, and mixed for one hour at room temperature. The amounts of alpha/iso-alpha-acid were monitored by HPLC, until no further reduction was observed. The precipitate was removed by filtration through a Whatman #4 filter paper, and the filtrate was then added back to the solid residues of the double extraction in a 5 liter round bottom flask. The thus formed mixture was rotary evaporated (under 31 torr at 40-50° C.) to remove ethanol and water. Lyophilizing removed the residual moisture and afforded dried solids for subsequent usage. A number of light stable hops were thus prepared and analyzed by HPLC (as shown in Table 2).

TABLE 2

Data of Light Stable Hops Added in Brews

| # | LS-Hops Type | Treatment | Addition Rate (ppm) | % Residual alpha/Iso-alpha-acids |
|---|---|---|---|---|
| 1 | Galena Hop Solids | None | 2000 | 0.110 |
| 2 | Cascade Hop Solids | None | 2000 | 0.080 |
| 3 | 1A-Galena | 1X4-pH 8 | 1592 | 0.010 |
| 4 | 1B-Cascade | 1X4-pH 8 | 1434 | 0.014 |
| 5 | 3A-Galena | 1X4-neutral | 1630 | 0.040 |
| 6 | 3B-Cascade | 1X4-neutral | 984 | 0.003 |
| 7 | 4A-Galena- | $CuSO_4$ | 1612 | 0.037 |
| 8 | 4B-Cascade | $CuSO_4$ | 1288 | 0.014 |
| 9 | 5A-Galena | $Cu(OAc)_2$ | 862 | 0.019 |
| 10 | 5B-Cascade | $Cu(OAc)_2$ | 660 | 0.010 |
| 11 | 6A-Galena | 3X4-neutral | 1216 | 0.015 |
| 12 | 6B-Cascade | 3X4-neutral | 1338 | 0.036 |
| 13 | 7A-Galena | $Ca(OH)_2$ | 846 | 0.012 |
| 14 | 7B-Cascade | $Ca(OAc)_2$ | 1468 | 0.017 |
| 15 | 8A-Galena | CuCl | 1570 | 0.042 |
| 16 | 8B-Cascade | CuCl | 1194 | 0.010 |
| 17 | 9A-Galena | $ZnSO_4$ | 860 | 0.013 |
| 18 | 9B-Cascade | $ZnSO4$ | 1476 | 0.021 |
| 19 | 10A-Galena | $Zn(OAc)_2$ | 1288 | 0.023 |
| 20 | 10B-Cascade | $Zn(OAc)_2$ | 1760 | 0.029 |
| 21 | 11A-Galena | $NaBH_4$ | 1538 | 0.110 |
| 22 | 11B-Cascade | $NaBH_4$ | 1846 | 0.085 |
| 23 | 12A-Galena | Double X | 1920 | 0.048 |
| 24 | 12B-Cascade | Double X | 1748 | 0.016 |
| 25 | 13A-Galena | Double X + HOF | 192 | 0.048 |
| 26 | 13B-Cascade | Double X + HOF | 175 | 0.016 |

Pilot Brews Hopped with Candidate Light Stable Hops

Despite the estimation and prediction of light stability, actual light stability must be confirmed by sensory observation. Possible light stable hops made in accordance with each of the four techniques discussed above, and other treated light stable hop samples, were submitted for pilot brews, as follows.

The double extracted residues (Double X, Examples 23 and 24) employing 95% ethanol extraction, were brewed at 1920 and 1748 ppm, respectively, as Pilot Brews 8679 and 8670.

To evaluate the effect of the Hop Oil Fraction (HOF) and compensate for the loss of aroma and flavor components resulting from double extraction, 1 gram of HOF was added to 8 grams of the double extracted residues (Examples 25 and 26). These were brewed at 192 and 175 ppm levels, as Pilot Brews 8685 and 8686.

Ion exchange resin treated samples (Examples 3, 4, 5, 6 and 11) were brewed as Pilot Brews 8664, 8666, 8665, 8667, and 8673. Sample 12 did not brew due to containing a higher alpha/iso-alpha-acids content.

Additional Pilot Brews, numbered 8671, 8672, 8674, 8675, 8676, 8677, 8683, 8681, and 8682 were hopped with various alkali metal ion precipitated light stable (LS) Hops corresponding to Examples 8, 10, 13, 15, 16, 20, 14, 18, and 19, respectively.

In addition to the above, two sodium borohydride reduction treated hop solids (Examples 21 and 22) were brewed as Pilot Brews 8678 and 8684. Three control Pilot Brews, Numbers 8661, 8662, and 8663, were unhopped (8661) and hopped with 2000 ppm of Galena hop solids (8662) and Cascade hop solids (8663), respectively. Analytical data may be found in Tables 3 and 4, hereinafter.

Sensory Evaluation of Pilot Brews: Light Stability

Samples of the Pilot Brews, all bottled in 12 oz clear bottles, then packaged in six-pack paper carriers having a height of 5¼ inches, were exposed to 25 foot-candles of fluorescent light for 20 days. A total of 23 products were thus evaluated. Testing was conducted on each exposed sample, and compared to a corresponding unexposed sample. All such testing involved subjectively rating the samples on sulfur character and skunky character. Mean scores are based upon a 24-point linear scale, where 1 is weak, and 24 is strong. The results are set forth in Table 4.

Sensory Evaluation of Pilot Brews: Round Table Evaluation

Pilot brews were prepared and characterized in round table sensory evaluation, based upon promising results in light stability testing. The purpose of such testing was to obtain a descriptive profile of each unexposed LS-Hops candidate. The Cascade based LS-Hops candidates seemed to have stronger, fruity/estery notes than the Galena LS-Hops candidates. Panelists also indicated preferences for pilot brews 8680, 8686, 8676, 8683, 8667, 8672, and 8673. Of these, only the last was based upon a Galena hop solids. These evaluations are shown in Table 4.

Correlation between Sensory Light Stability and Analytical iso-alpha-acids

A general good correlation between sensory scores (skunkiness) and analytical iso-alpha-acid content demonstrated that the limited iso-alpha-acids present in the Pilot Brews prepared from low iso-alpha-acid content LS-Hops were less subject to skunkiness, and were more acceptable. Analysis indicated that light stable hops preferably have iso-alpha-acid contents of less than 0.2-0.3 ppm.

TABLE 3

Summary of Light Stability and Skunkiness

| # | LS-HOPS | Brew # | Iso-α-acids % (ppm) | Stability Prediction | Sensory Score Exposed/None | Skunkiness |
|---|---|---|---|---|---|---|
| 0 | Unhopped | 8661 | None | Yes | 3.4/2.9 | none |
| 1 | Galena Hop Solids | 8662 | 0.11 (2.20) | No | 17.0/2.9 | very strong |
| 2 | Cascade Hop Solids | 8663 | 0.080 (1.60) | No | 14.5/2.9 | very strong |
| 3 | 1A-1X4 pH 8 | 8664 | 0.010 (0.02) | Yes | 10/3.0 | strong |
| 4 | 1B-1X4 pH 8 | 8666 | 0.014 (0.20) | Yes | 4.9/3.0 | trace |
| 5 | 3A-1X4 neutral | 8665 | 0.046 (0.65) | Marginal | 15.8/2.9 | very strong |
| 6 | 3B-1X4 neutral | 8667 | 0.003 (0.03) | Yes | 4.8/3.1 | trace |
| 7 | 4A-$CuSO_4$ | | 0.037 (0.60) | Marginal | | |
| 8 | 4B-$CuSO_4$ | 8671 | 0.014 (0.18) | Yes | — | Discarded |
| 9 | 5A-$Cu(OAc)_2$ | | 0.019 0.16) | Marginal | | |

TABLE 3-continued

Summary of Light Stability and Skunkiness

| # | LS-HOPS | Brew # | Iso-α-acids % (ppm) | Stability Prediction | Sensory Score Exposed/None | Skunkiness |
|---|---|---|---|---|---|---|
| 10 | 5B-Cu(OAc)$_2$ | 8672 | 0.010 (0.07) | Yes | 2.9/2.6 | none |
| 11 | 6A-3X4 neutral | 8673 | 0.015 (0.18) | Yes | 4.4/2.5 | trace |
| 12 | 6B-3X4 neutral |  | 0.036 (0.48) | No |  |  |
| 13 | 7A-Ca(OH)$_2$ | 8674 | 0.012 (0.10) | Yes | 3.8/2.6 | none |
| 14 | 7B-Ca(OH)$_2$ | 8683 | 0.017 (0.25) | Yes | 4.0/3.7 | none |
| 15 | 8A-CuCl | 8675 | 0.042 (0.66) | No | 4.1/3.2 | none |
| 16 | 8B-CuCl | 8676 | 0.010 (0.12) | Yes | 2.7/3.0 | none |
| 17 | 9A-ZnSO$_4$ |  | 0.013 (0.11) | Yes |  |  |
| 18 | 9B-ZnSO$_4$ | 8681 | 0.021 (0.31) | Yes | 4.3/3.2 | trace |
| 19 | 10A-Zn(OAc)$_2$ | 8682 | 0.023 (0.30) | Marginal | 2.9/2.7 | none |
| 20 | 10B-Zn(OAc)$_2$ | 8677 | 0.029 (0.51) | Marginal | 6.7/2.7 | slight |
| 21 | 11A-SWS | 8678 | 0.110 (1.69) | No | 8.9/2.6 | moderate |
| 22 | 11B-SWS | 8684 | 0.085 (1.57) | No | 10.3/2.8 | strong |
| 23 | 12A-DX | 8679 | 0.017 (0.32) | No | 6.1/2.6 | slight |
| 24 | 12B-DX | 8680 | 0.016 (0.28) | Yes | 2.7/2.3 | none |
| 25 | 13A-DX + HCF | 8685 | 0.048 (0.09) | Yes | 3.6/2.8 | trace |
| 26 | 13B-DX + HCF | 8686 | 0.016 (0.03) | Yes | 3.0/2.7 | none |

TABLE 4

Sensory Round Table Evaluation

| LS-Hops | P.B. | Round Table Evaluation |
|---|---|---|
| #4 - 1X4 pH 8 | 8666 | Slight fruity/estery; low aroma strength; low to moderate Sulfur; slight hop aroma; slightly malty; water/thin |
| #6 - 1X4 neutral | 8667 | Low to moderate fruity; hoppy aroma; hoppy taste |
| #10 - Cu(OA)$_2$ | 8672 | Fruity/estery/banana; slight hop aroma; thin slight lingering after taste; slight metallic; slight sulfur |
| #11 - 3X4 neutral | 8673 | Slight fruity; slight hoppy aroma; hoppy flavor; slight lingering aftertaste; malty |
| #13 - Ca(OH)$_2$ | 8674 | Low aroma and fruity; low to moderate hop aroma; slight hoppy taste; slight malty |
| #14 - Ca(OAc)$_2$ | 8683 | Fruity/estery; hoppy taste; hoppy aroma; slight citrus aroma; slight lingering aftertaste; slight mouthcoat |
| #15 - CuCl | 8675 | Slight fruity; hoppy aroma; slight malty; lingering aftertaste |
| #16 - CuCl | 8676 | Low to moderate fruity; hoppy aroma; hoppy taste; slight metallic; slight astringent |
| #18 - ZnSO$_4$ | 8681 | Low to moderate fruity/estery; hoppy aroma; clove; solvent aroma; slight astringent |
| #19 - Zn(OAc)$_2$ | 8682 | Low to moderate fruity; clove solvent aroma; malty; hoppy taste; sulfur |
| #23 - DX | 8679 | Slight fruity; low malt; harsh; lingering aftertaste |
| #24 - DX | 8680 | Low to moderate fruity/estery; low to moderate hop aroma; moderate hop flavor; sulfur; low aftertaste |
| #25 - DX + HOF | 8685 | Hoppy aroma; hoppy taste; lingering bitter aftertaste |
| #26 - DX + HOF | 8686 | Fruity/estery; low aroma strength; fruity, floral, citrus taste; slight lingering aftertaste |

Although the present invention has been described in considerable detail with reference to certain preferred embodiments, one skilled in the art will appreciate that the present invention can be practiced by other than the preferred embodiments, which have been presented for purposes of illustration and not of limitation. For example, alternative forms of hop solids, other than the Galena and Cascade hop solids utilized herein, may be used.

Therefore, the scope of the appended claims should not be limited to the description of the preferred embodiments contained herein.

INDUSTRIAL APPLICABILITY

The methods taught herein are useful in the preparation of brewed beverages, such as beer and ale, and specifically permit the brewing of beers and ale which may be stored in uncolored or non-light filtering containers with little or no danger of development of objectionable skunkiness.

We claim:

1. A method for the preparation of a light stable hop product, the method comprising:

mixing hop solids with a first alcohol solvent to form a mixture of the hop solids and the first alcohol solvent, the hop solids being residue obtained by extracting hops with carbon dioxide;

separating the mixture of the hop solids and the first alcohol solvent into treated hop solids and a first filtrate including alpha/iso-alpha acids;

mixing the treated hop solids with a second alcohol solvent to form a mixture of the treated hop solids and the second alcohol solvent;

separating the mixture of the treated hop solids and the second alcohol solvent into hop solids residues and a second filtrate including alpha/iso-alpha acids; and precipitating said alpha/iso-alpha-acids in said first filtrate or said second filtrate by addition of a compound, selected from the group consisting of calcium carbonate, calcium hydroxide, magnesium hydroxide, magnesium carbonate, magnesium acetate, zinc sulfate, and zinc acetate, to said first filtrate or to said second filtrate, removing precipitated alpha/iso-alpha-acids from said first filtrate or from said second filtrate to form a purified filtrate and a light stable hop product comprising the hop solids residues containing no alpha/iso-alpha acids, blending the purified filtrate with the light stable hop product, and evaporating off aqueous alcohol from the light stable hop product.

2. The method of claim 1, wherein the first alcohol solvent and the second alcohol solvent are aqueous ethanol having a concentration of from 10 to 95 percent ethanol.

3. The method of claim 1, further comprising:
blending the hop wilds residues with a hop oil fraction to form the light stable hop product.

4. The method of claim 1, further comprising:
blending the hop wilds residues with a beta-acid rich fraction to form the light stable hop product.

5. The method of claim 1, further comprising:
blending the hop wilds residues with light stable bittering agents to form the light able hop product.

6. The method of claim 1, further comprising:
blending the hop solids residues with a member of the group consisting of a hop oil fraction, a beta-acid rich fraction, a light stable bittering agent, and mixtures thereof to form the light stable hop product.

7. A method for the preparation of a light stable hop product, the method comprising:
mixing hop solids with a first alcohol solvent to form a mixture of the hop solids and the first alcohol solvent, the hop solids being residue obtained by extracting hops with carbon dioxide;
separating the mixture of the hop solids and the first alcohol solvent into treated hop solids and a first filtrate including alpha/iso-alpha acids;
mixing the treated hop solids with a second alcohol solvent to form a mixture of the treated hop solids and the second alcohol solvent;
separating the mixture of the treated hop solids and the second alcohol solvent into hop solids residues and a second filtrate including alpha/iso-alpha acids;
removing alpha/iso-alpha-acids from the first filtrate or the second filtrate to form a purified filtrate; and
blending the purified filtrate with the hop solids residues to form a light stable hop product.

8. The method of claim 7 wherein the step of removing alpha/iso-alpha-acids from the first filtrate or the second filtrate to form a purified filtrate comprises:
using an ion exchange resin to remove alpha/iso-alpha-acids from the first filtrate or the second filtrate to form the purified filtrate.

9. The method of claim 7 wherein the step of removing alpha/iso-alpha-acids from the first filtrate or the second filtrate to form a purified filtrate comprises:
precipitating alpha/iso-alpha-acids in the first filtrate or the second filtrate by addition of a metal ion to the first filtrate or the second filtrate, and
removing precipitated alpha/iso-alpha-acids from the first filtrate or the second filtrate to form the purified filtrate.

10. The method of claim 9 wherein:
the metal ion is selected from the group consisting of calcium, magnesium, and zinc.

11. The method of claim 7 wherein the step of removing alpha/iso-alpha-acids from the first filtrate or the second filtrate to form a purified filtrate comprises:
precipitating alpha/iso-alpha-acids in the first filtrate or the second filtrate by addition of a compound, selected from the group consisting of calcium carbonate, calcium hydroxide, magnesium hydroxide, magnesium carbonate, magnesium acetate, zinc sulfate, and zinc acetate, to the first filtrate or the second filtrate, and
removing precipitated alpha/iso-alpha-acids from the first filtrate or the second filtrate to form the purified filtrate.

* * * * *

UNITED STATES PATENT AND TRADEMARK OFFICE
CERTIFICATE OF CORRECTION

PATENT NO. : 7,258,887 B2
APPLICATION NO. : 10/106603
DATED : August 21, 2007
INVENTOR(S) : Patrick L. Ting et al.

It is certified that error appears in the above-identified patent and that said Letters Patent is hereby corrected as shown below:

In the Abstract, line 12, "alpha/iso-alpha-acid is" should be -- alpha/iso-alpha-acids --.

At column 4, line 34, "iso-alpha-ac,ids" should be -- iso-alpha-acids --.

In claim 3, column 11, line 21, "wilds" should be -- solids --.

In claim 4, column 11, line 24, "wilds" should be -- solids --.

In claim 5, column 11, line 27, "wilds" should be -- solids --.

In claim 5, column 11, line 28, "able" should read -- stable --.

Signed and Sealed this

Twenty-second Day of July, 2008

JON W. DUDAS
*Director of the United States Patent and Trademark Office*